(12) United States Patent
Wakimoto

(10) Patent No.: US 11,250,622 B2
(45) Date of Patent: Feb. 15, 2022

(54) MAP CREATION SYSTEM AND MAP CREATION METHOD

(71) Applicant: Mitsubishi Electric Corporation, Tokyo (JP)

(72) Inventor: Koji Wakimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 714 days.

(21) Appl. No.: 16/070,755

(22) PCT Filed: Mar. 7, 2016

(86) PCT No.: PCT/JP2016/056925
§ 371 (c)(1),
(2) Date: Jul. 17, 2018

(87) PCT Pub. No.: WO2017/154061
PCT Pub. Date: Sep. 14, 2017

(65) Prior Publication Data
US 2021/0174579 A1    Jun. 10, 2021

(51) Int. Cl.
*G06T 17/05* (2011.01)
*G06T 7/73* (2017.01)
(Continued)

(52) U.S. Cl.
CPC ............. *G06T 17/05* (2013.01); *G01S 17/89* (2013.01); *G06K 9/4604* (2013.01); *G06T 7/73* (2017.01);
(Continued)

(58) Field of Classification Search
CPC .......... G06T 7/73; G06T 17/05; G06T 19/003
(Continued)

(56) References Cited

U.S. PATENT DOCUMENTS

2010/0118116 A1    5/2010 Tomasz et al.
2013/0010074 A1    1/2013 Takiguchi et al.
(Continued)

FOREIGN PATENT DOCUMENTS

JP    2009-204615 A    9/2009
JP    2010-533282 A    10/2010

OTHER PUBLICATIONS

Previtali et al. "A Flexible Methodology for Outdoor/Indoor Building Reconstruction From Occluded Point Clouds", ISPRS Annals of the Photogrammetry, Remote Sensing and Spatial Information Sciences, ISPRS Technical Commission III Symposium, Zurich, Switzerland, vol. II-3, Sep. 5-7, 2014, pp. 119-126.

*Primary Examiner* — Thomas J Lett
(74) *Attorney, Agent, or Firm* — Birch, Stewart, Kolasch & Birch, LLP

(57) ABSTRACT

In order to create an accurate map with a simple operation, the map creation system includes: a relative position acquisition means to measure distances and directions from a sensor to points on a surface of an infrastructure or an object and to create point cloud data in a relative space with the sensor at the center thereof; a sensor position acquisition means to measure the position and the attitude of the sensor and to create sensor position data; an absolute position calculation means to calculate position information of the point cloud in the absolute space on the basis of the point cloud data in the relative space and the sensor position data; a direction-vector calculation means to obtain a direction vector from the sensor to each point of the point cloud in the absolute space on the basis of the point cloud data in the relative space and the sensor position data; an area detection means to extract points composing a plane area on the basis of the position information and the direction vectors of the point cloud in the absolute space and to obtain the area outline on the basis of the distribution of the extracted (Continued)

points; and a drawing means to draw a picture representing the detected area outline with a line.

2 Claims, 10 Drawing Sheets

(51) Int. Cl.
*G01S 17/89* (2020.01)
*G06K 9/46* (2006.01)
*G09B 29/00* (2006.01)

(52) U.S. Cl.
CPC .. *G09B 29/003* (2013.01); *G06T 2207/10028* (2013.01)

(58) Field of Classification Search
USPC .......................................... 345/419
See application file for complete search history.

(56) References Cited

U.S. PATENT DOCUMENTS

| 2017/0192418 | A1* | 7/2017 | Bethke | B64D 47/00 |
| 2018/0002010 | A1* | 1/2018 | Bauer | B64C 39/024 |
| 2018/0137678 | A1* | 5/2018 | Kaehler | G02B 27/017 |

\* cited by examiner

Fig. 3

| Time | Absolute position | | | Attitude | | |
|------|---|---|---|---|---|---|
| | X | Y | Z | R | P | Y |
| | | | | | | |
| | | | | | | |

(b) Form of sensor position data

| Time | Relative position | | |
|------|---|---|---|
| | x | y | z |
| | | | |
| | | | |

(a) Form of point cloud data (relative positions)

Fig. 4

| Position | | |
|---|---|---|
| X | Y | Z |
| | | |
| | | |

(a) Form of point cloud data
(absolute positions)

| Position | | | Direction | | |
|---|---|---|---|---|---|
| X | Y | Z | U | V | W |
| | | | | | |
| | | | | | |

(b) Form of point cloud data
(with direction vectors)

Fig. 10

* : Initial value (-1 etc)
0 : not to be extracted
1 : to be extracted/detected
9 : Defect area candidate (a) Initialization stage (b) After projection (c) After compensation for defect area (d) Area detection result

MAP CREATION SYSTEM AND MAP CREATION METHOD

TECHNICAL FIELD

The present invention relates to a map creation system and a map creation method to create a map by measuring the positions and shapes of infrastructures or objects along a road.

BACKGROUND ART

Patent Document 1 discloses a system to create a map by calculating the positions of infrastructures or objects along a road by using point cloud data acquired by a laser measurement unit installed in a traveling vehicle. In the description of the system, a method to acquire the "laser-measured point" corresponding to the position indicated by an operator on a screen and to determine an outline of an infrastructure or an object on the basis of the position information of the point is disclosed. Also, a method to create a map on the basis of obtained position information of infrastructures or objects is disclosed.

Also, Non-Patent Document 1 discloses a method to obtain the three-dimensional shape of a building etc along a road by using the point cloud data acquired by a laser measurement unit installed in a vehicle. The disclosed method is to detect an area, such as a building wall, by analyzing the point cloud data with a computer program and to determine the three-dimensional shape of the building by obtaining the area outlines.

REFERENCES CITED

Patent Documents

Document 1: Unexamined Patent Application Publication Number JP, 2009-204615

Other Publications

Publication 1: Previtali, M., M. Scaioni, L. Barazzetti, and R. Brumana., "A Flexible Methodology for Outdoor/indoor Building Reconstruction from Occluded Point Clouds", ISPRS Annals of Photogrammetry, Remote Sensing and Spatial Information Sciences, vol. 11-3, 2014, pp. 119-26.

SUMMARY OF THE INVENTION

Problems to be Solved by the Invention

A conventional map creation system is configured as described above. The problem of the conventional method in which an operator indicates the outlines of the infrastructures or objects on a screen to determine the positions thereof is that, when the shape of an infrastructure or an object is complicated or the number of infrastructures or objects is large, the number of the operator's indications becomes large and, therefore, the operation becomes complicated. The problem of the method in which the point cloud data is analyzed by a computer program for area detection to obtain the three-dimensional shape is that, when a point on one plane is close to a point on another plane, there is a chance of detecting an area that does not really exist by making a mistake to judge these points are on the same plane. If this happens, the operator has to correct the error, which makes the operation complicated.

There is another problem; an area defect, which occurs in the course of laser measurement, and the like causes an erroneous detection of an area that differs from any of the real ones, which requires large volume of work for the correction. Particularly, a laser measurement unit, in its nature, does not detect an infrastructure or an object behind an interfering thing. Then, a tree along a road, for example, causes a defect in the point cloud data of a building behind the tree, which prevents a correct detection of an area to create an accurate map.

The object of the present invention is to solve such problems and to provide a map creation system which can create an accurate map with a simple operation.

Solution to Problems

The map creation system according to the present invention includes: a relative position acquisition means to measure distances and directions from a sensor to points on a surface of an infrastructure or an object and to create point cloud data in a relative space with the sensor at the center thereof; a sensor position acquisition means to measure the position and the attitude of the sensor and to create sensor position data; an absolute position calculation means to calculate position information of the point cloud in the absolute space on the basis of the point cloud data in the relative space and the sensor position data; a direction-vector calculation means to obtain a direction vector from the sensor to each point of the point cloud in the absolute space on the basis of the point cloud data in the relative space and the sensor position data; an area detection means to extract points composing a plane area on the basis of the position information and the direction vectors of the point cloud in the absolute space and to obtain the area outline on the basis of the distribution of the extracted points; and a drawing means to draw a picture representing the detected area outline with a line, wherein the area detection means includes a reference plane setting means to set a reference plane to provide a reference in the three-dimensional space and a point cloud extraction means to extract a point whose neighborhood points have direction vector distribution that fits vector distribution calculated from positional relationships between the reference plane and the sensor position data.

Advantages of the Invention

According to the present invention, a map creation system which can create an accurate map with a simple operation can be provided.

BRIEF DESCRIPTION OF THE DRAWINGS

FIG. 3 illustrate examples of forms of data to be acquired by a mobile measurement vehicle included in the map creation system according to Embodiment 1 of the present invention.

FIG. 4 illustrate examples of forms of the point cloud data created by a data processing system of the map creation system according to Embodiment 1 of the present invention.

FIG. 10 are illustrative drawings to explain area detection of the map creation system according to Embodiment 2 of the present invention.

DESCRIPTION OF EMBODIMENTS

Embodiment 1

Figure 1:
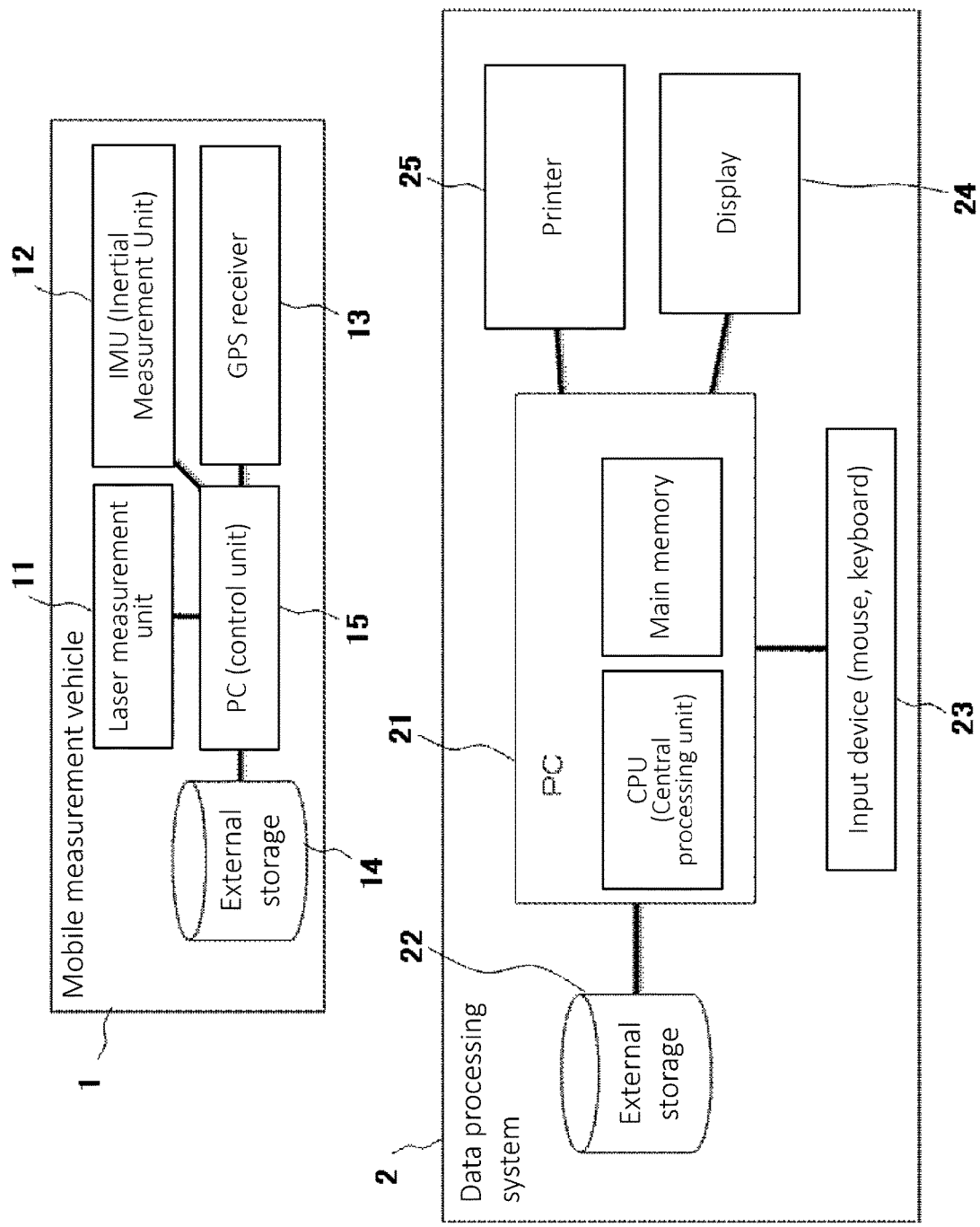
FIG. 1 is a diagram showing a configuration of a map creation system according to Embodiment 1 of the present invention.
Figure 2:
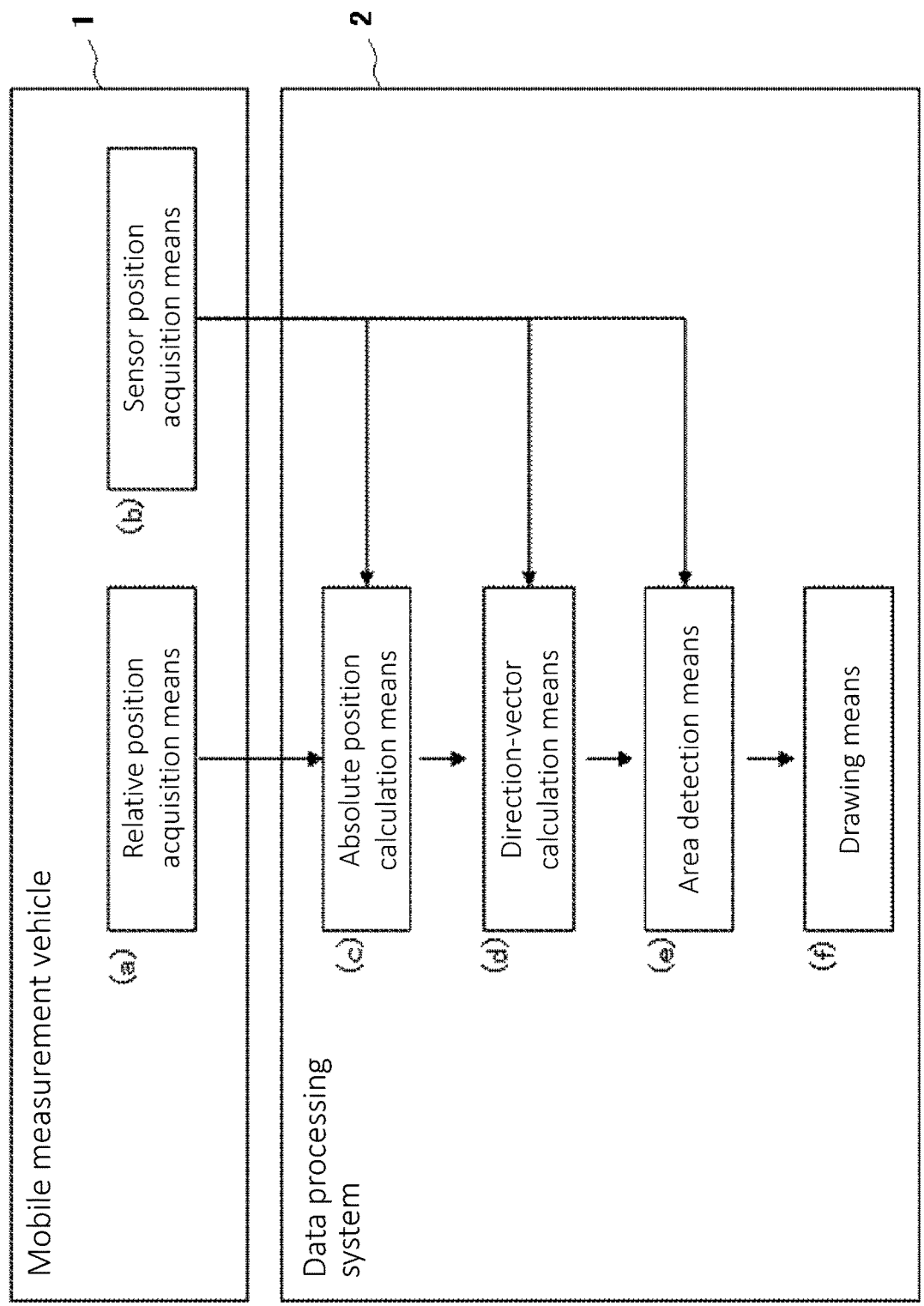
FIG. 2 is a flowchart showing an example of the process flow of the map creation system according to Embodiment 1 of the present invention.

FIG. 1 is a diagram showing a configuration example of a map creation system according to Embodiment 1 of the present invention. FIG. 2 is a diagram showing an example of a process flow of the map creation system according to Embodiment 1 of the present invention. This diagram also shows function blocks of the map creation system according to Embodiment 1.

In FIG. 1, sign 1 denotes a mobile measurement vehicle, sign 2 denotes a data processing system, sign 11 denotes a laser measurement unit, sign 12 denotes an inertial measurement unit (IMU), sign 13 denotes a global positioning system (GPS) receiver, sign 14 denotes an external storage, sign 15 denotes a PC (control unit), sign 21 denotes a personal computer (PC), sign 22 denotes an external storage, sign 23 denotes an input device (mouse, keyboard), sign 24 denotes a display, and sign 25 denotes a printer.

(System Configuration)

Following are descriptions of components of the system shown in FIG. 1.

The mobile measurement vehicle 1 equipped with the following units collects measurement data while traveling. The laser measurement unit 11 is a unit to measure the distance and the direction to an object by emitting laser beams in various directions and by observing the reflected light. The IMU 12 is a unit to observe a vehicle's attitude change by using the law of inertia. The GPS receiver 13 is a measurement unit to measure the absolute position of the vehicle by receiving radio waves from satellites. The external storage 14 stores measurement data from each unit in association with times thereof. The PC (control unit) 15 controls the laser measurement unit 11, the IMU 12, and the GPS receiver 13, and stores the measurement data in the external storage 14. A personal computer may be used for it.

The data processing system 2 is a system to process the measurement data collected by the mobile measurement vehicle to create a map. The data processing system 2 is composed of the following units and devices. The PC (personal computer) 21, incorporating a central processing unit (CPU) and a main memory therein, executes a software prepared in advance to perform data processing.

The external storage 22 stores the measurement data collected by the mobile measurement vehicle 1. The PC 21 reads out the stored data to perform data processing. In FIG. 1, the mobile measurement vehicle 1 and the data processing system 2 each include the external storages 14 and 22. However, it is also possible to take out the external storage 14 from the mobile measurement vehicle 1 and connect it to the PC 21 of the data processing system 2 as the external storage 22. Alternatively, the mobile measurement vehicle 1 and the data processing system 2 may be connected through a network to copy the data between them. The map information created as a result of the data processing is also stored in this storage.

The input device 23 includes a mouse and a keyboard, and a user enters instructions for map creation through this device. The display 24 displays the measurement data and the created map data on a screen. The printer 25 prints the created map data.

(Operations)

Next, a map creation processing flow in this system is described with FIG. 2 as reference.

(a) Relative Position Acquisition

The laser measurement unit 11—installed in the mobile measurement vehicle 1—continuously rotates its laser emitter to emit laser beams in various directions and measures time delays for the laser beams to be reflected by targets and to return back to calculate the distance and the direction to the reflection points. Then, the laser measurement unit 11 calculates the positions (x, y, z) in a relative space on the basis of the distances and the directions.

The form of measurement data to be acquired is represented by combinations of the positions (x, y, z) in the relative space and their respective times of day of laser irradiation as shown in FIG. 3($a$). Here the relative space is represented by a three-dimensional Cartesian coordinate whose origin is the position of the laser measurement unit 11. The X-axis, y-axis, and z-axis are defined, for example, as the right direction of the vehicle travel direction, the vehicle travel direction, and the upward direction of the vehicle travel direction, respectively.

(b) Acquiring Sensor Positions

The absolute position of the mobile measurement vehicle 1 is acquired by the GPS receiver 13, for example, at every 0.1 second and recorded in association with the time of day.

The GPS receiver 13 can obtain latitude, longitude and altitude information of a specific position. In this Embodiment, this position information is converted and recorded as a definition of a specific ENU (East, North, Up) coordinate, where an ENU coordinate is a three-dimensional Cartesian coordinate whose origin is a specific point identified by its latitude, longitude and altitude, with its X axis oriented to the east, its Y axis oriented to the north, and its Z axis oriented to the zenith direction.

Also, the attitude of the vehicle 1 at each time of day is measured on the basis of the output of the IMU 12 and the measurement result is recorded in association with the time of day similarly as above. Here the vehicle's attitude is represented by the combination of tree angles: roll (R), pitch (P), and yaw (Y). Roll is the rotation angle around the travel direction axis (y axis); pitch is the rotation angle around the right direction axis (x axis) of the travel direction; and yaw is the rotation angle around the upward direction axis (z axis) of the travel direction.

In FIG. 3($b$), an example of sensor position data form is shown.

The process up to this stage is performed in the mobile measurement vehicle 1 and the obtained point cloud data (relative positions) and the sensor position data are stored in the external storage 14 of the mobile measurement vehicle 1.

(c) Calculating Absolute Positions

The process from here is performed in the data processing system 2. The point cloud data (relative positions) and the sensor position data obtained as described above are transferred from the external storage 14 of the mobile measurement vehicle 1 to the external storage 22 of the data processing system 2.

In the data processing system 2, the relative coordinates of the point cloud data are converted to the absolute coordinates by a program operating on the PC 21 using the sensor position data. The relative coordinates (x, y, z) measured at a time of day t is converted to the absolute coordinates (X, Y, Z) according to the following formula;

[Formula 1]
$$\begin{bmatrix} X \\ Y \\ Z \end{bmatrix} = R \begin{bmatrix} x \\ y \\ z \end{bmatrix} + T \quad \text{(Formula 1)}$$

where R is a rotation matrix which can be calculated from the attitude data Rt, Pt, Yt at the time of day t of the sensor using a known formula and T is a translation vector given by the following formula when the sensor position data at the time of day t is represented by Xt, Yt, and Zt;

[Formula 2]
$$\begin{bmatrix} X_t \\ Y_t \\ Z_t \end{bmatrix} \quad \text{(Formula 2)}$$

FIG. 4(*a*) is an example of the form of obtained point cloud data (absolute positions).

(d) Direction Vector Calculation

Next, direction vectors in the absolute space are obtained on the basis of the sensor position data and the relative coordinates of the point cloud data. A direction vector (U, V, W) measured at the time of day t can be obtained by the following formula;

[Formula 3]
$$\begin{bmatrix} U \\ V \\ W \end{bmatrix} = R \begin{bmatrix} x \\ y \\ z \end{bmatrix} \quad \text{(Formula 3)}$$

where R is a rotation matrix which is the same as that used in the absolute position calculation and (x, y, z) are relative coordinates of a point measured at the time of day t.

The obtained direction vector is stored as attribute information of each point composing the point cloud data.

FIG. 4(*b*) is an example of the form of obtained point cloud data (with direction vectors).

(e) Area Detection

Figure 5:
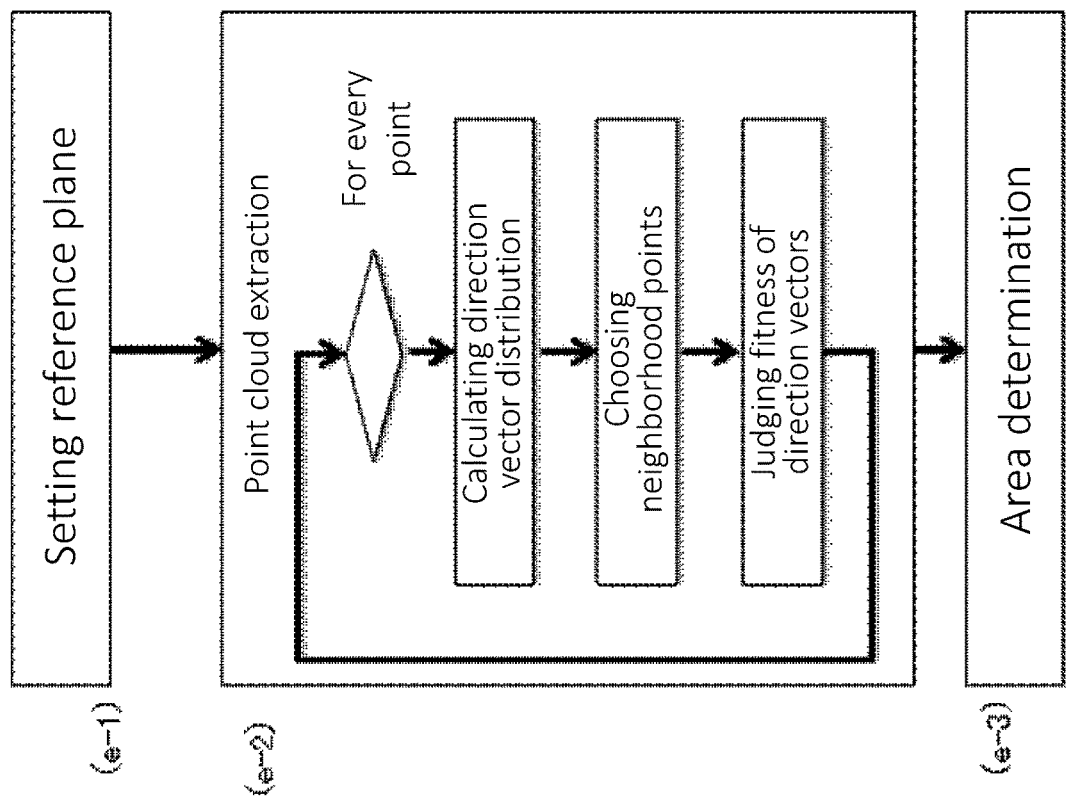
FIG. 5 is a flowchart showing an example of the process flow of an area detection means in the map creation system according to Embodiment 1 of the present invention.

FIG. 5 shows a flow of the area detection process. FIG. 5 is also regarded as a function block diagram of the area detection means, showing the details thereof, of the map creation system according to Embodiment 1.

(e-1) Setting Reference Plane

Figure 6:
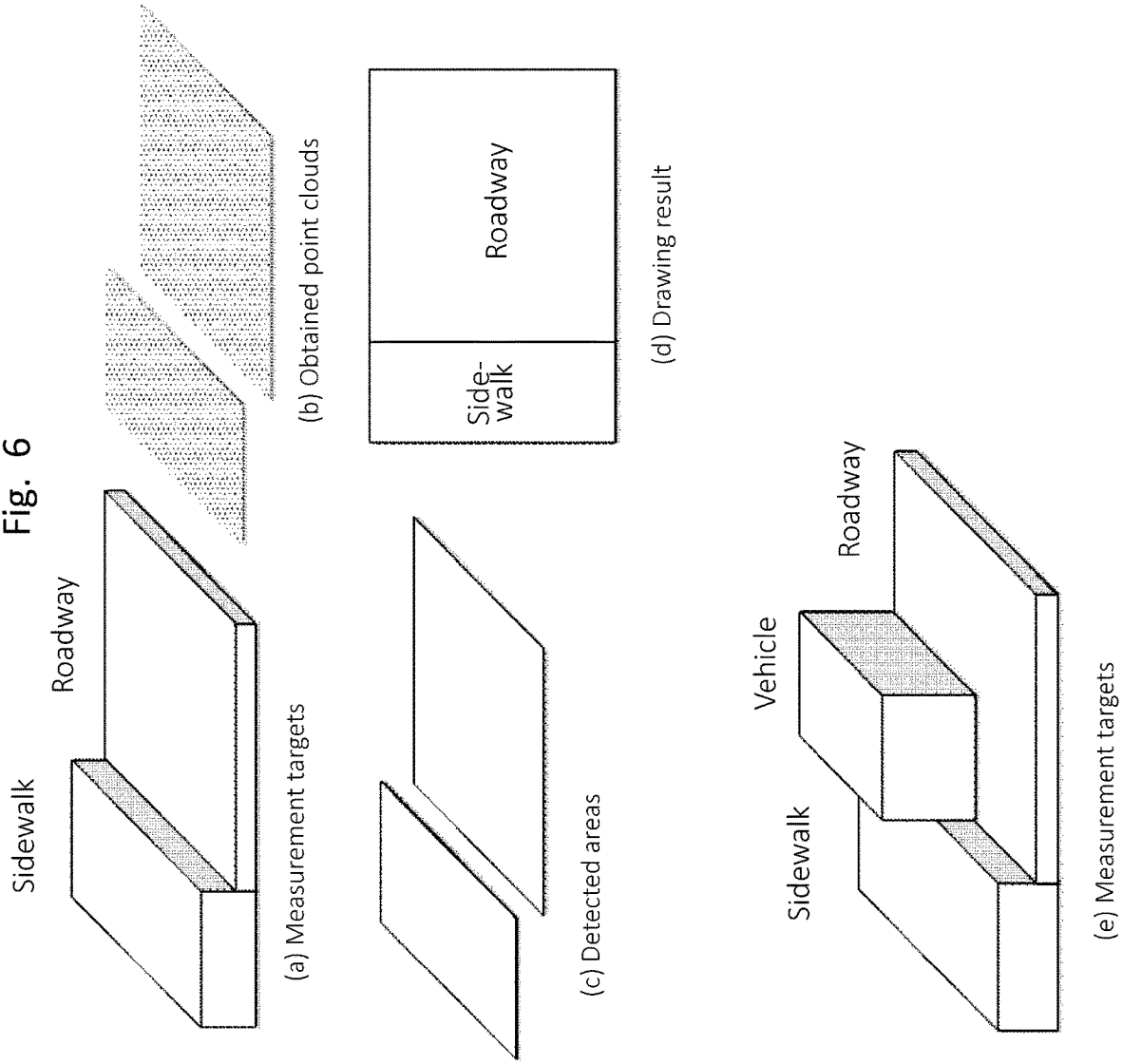
FIG. 6 are illustrative drawings to explain area detection of the map creation system according to Embodiment 1 of the present invention.

FIG. 6(*a*) shows exemplary infrastructures as measurement targets. As shown in the drawing, the measurement targets include a sidewalk area and a roadway area. Since the relative heights in the sidewalk area and the roadway area against the sensor installed in the mobile vehicle are each substantially constants, these relative heights or values z0 and z1, respectively, are set in advance. By applying the formula 1 to the relative coordinates z0 and z1 using the rotation matrix R and the translation vector T at the time of day when the unit measured around a point in the area, the Z-axis coordinates Z0 and Z1 thereof are calculated. Two planes defined by these Z coordinates, a plane Z=Z0 and a plane Z=Z1, are set as a reference plane of the sidewalk area and a reference plane of the roadway area, respectively.

(e-2) Point Cloud Extraction

FIG. 6(*b*) illustrates an example of the point cloud data obtained by measuring the infrastructures shown in FIG. 6(*a*). The points composing the sidewalk area and the roadway area are expected to be in the vicinity of the reference plane of the sidewalk area or the reference plane of the roadway area, respectively. Therefore, point clouds within a predetermined distance from each of the reference planes are extracted to be regarded as the point clouds which compose their areas.

(e-3) Area Determination

Each of the point cloud composing the sidewalk area and the point cloud composing the roadway area is regarded as a two-dimensional point cloud composed by points each determined by an X coordinate and a Y coordinate. Then, a polygon that surrounds each of the point clouds along their outlines is obtained by using a known method. This defines the area to be obtained. Thus, as shown in FIG. 6(*c*), both the sidewalk area and the roadway area are detected.

This is the basic flow of the area detection. In the process described above, the direction-vector information included in the point cloud data has not been used. Next, a method to improve accuracy of the area detection by using the direction-vector information is described. FIG. 6(*e*) is an example of a case where a vehicle is standing on the roadway. If the basic flow described above were applied to a case like this, some points that are on the vehicle and that are close to the sidewalk's reference plane would be extracted as points composing the sidewalk area. Using this extraction result for the area determination would lead to such an area determination result that the sidewalk area seems to protrude over the roadway. To avoid this, the following procedures are to be performed.

First, the laser measurement unit 11 installed in the mobile measurement vehicle 1 according to this Embodiment is assumed to be capable of emitting laser beams in almost all directions. Therefore, in the route of the mobile measurement, points at almost the same position are irradiated with the laser beams both from their forward side and from their backward side. The next step is to examine the point cloud data (with direction vectors) to find out "neighborhood points" that are points locating at almost the same position. The direction-vector distribution of neighborhood points depends on the direction of a plane to which the points belong and on the sensor position. In other words, in a case where the laser irradiates points both from the forward side and from the backward side like a case where the points are on a sidewalk or on a roadway, there exist both forward going vectors and backward going vectors in a set of direction vectors of the points included in the plane. However, a set of direction vectors of points that belong to a plane area facing the backward way like the rear side of a vehicle includes only forward going vectors. Then, regarding each "candidate point", direction vector distribution is calculated on the basis of the direction of the reference plane and the sensor position. Next, only a candidate point whose "neighborhood points" have direction vector distribution that fits the above calculated direction vector distribution is to be extracted. To be specific, point cloud extraction procedure mentioned above is expanded as the followings.

(e-2) Point Cloud Extraction (Expanded Way)

Regarding each point, one followed by another, included in the point cloud as a candidate point, the following determination procedure is performed to extract points which satisfy the condition.

(e-2-1) Calculating Direction Vector Distribution

Since the sensor does not observe a point on a far side plane area of the measurement target in laser measurement, the range where the direction vectors distribute depends on the positional relationships between the plane area and the sensor. When a plane close to a candidate point is identical to the reference plane, the envelope of direction vectors can be calculated from the information on the candidate point position, the reference plane direction, and the sensor trajectory.

The sensor trajectory can be acquired from the sensor position data. From among the sensor position data, by choosing a time of day at which the sensor is located at the same side of the reference plane and at which the distance between the sensor and the candidate point is within the range of the laser reach, a direction vector is obtained from the sensor position at a chosen time of day and the candidate point position. This is the calculated direction vector. Performing this for all the sensor positions gives the envelope of the calculated direction vectors.

Here, the sensor trajectory is assumed to be a straight line. Then, the envelope of the calculated direction vectors forms an arc. In this case, the envelope of the calculated direction vectors is represented by a "start direction vector" and an "end direction vector".

(e-2-2) Choosing Neighborhood Points

Points within a predetermined distance from the candidate point are chosen as neighborhood points (including the candidate point itself).

(e-2-3) Judging Fitness of Direction Vectors

Next, the direction vector distribution of neighborhood points is examined. First step is to check whether each of the direction vectors obtained above is on the envelope of the calculated direction vectors. In the case where the envelope of the calculated direction vectors is represented by an arc, the minimum distance between the end point of a direction vector of a neighborhood point and the arc is calculated. If the distance is within a predetermined distance, this direction vector is judged to be on the envelope of the calculated direction vectors.

Among the direction vectors of the neighborhood points, if a direction vector which is not judged to be on the envelope of the calculated direction vectors exists, the candidate point is determined not to fit the case.

When all of the direction vectors of the neighborhood points are determined to be on the envelope of the calculated direction vectors, an envelope of the direction vectors of neighborhood points is calculated. To be specific, for example, the range on the arc within which the direction vectors exist is obtained, where the arc is the one previously associated with the direction vectors and that is formed as the envelope of the calculated direction vectors. By comparing the envelope arc length of the direction vectors of neighborhood points with the envelope arc length of the calculated direction vectors, when the ratio of the former against the latter is within a predetermined value, the candidate point is determined to fit the case.

According to the above procedure, the points on the back side or the front side of a vehicle are not included in the points to be extracted since their direction vector distribution does not fit the direction vector distribution of the points on the roadway or on the sidewalk. As a result, a sidewalk area or a roadway area is correctly extracted.

(f) Drawing

Area outlines are drawn by lines on the basis of the area information obtained by the above procedure to create a map. FIG. 6(d) is an example of the drawing result.

A map creation system according to Embodiment 1 is configured as described above.

According to this configuration, a reference plane is assumed in the three-dimensional space, and points whose positions are close to the reference plane and whose direction vector distribution fits the direction of the reference plane are extracted. On the basis of the distribution of the extracted points, an area is detected. Therefore, it is possible to create a map with a simple operation without operator's detailed indications on the shapes of the infrastructures or the objects. It is also possible to create an accurate map without detecting a wrong area from points which belong to another plane.

Embodiment 2

Figure 8:
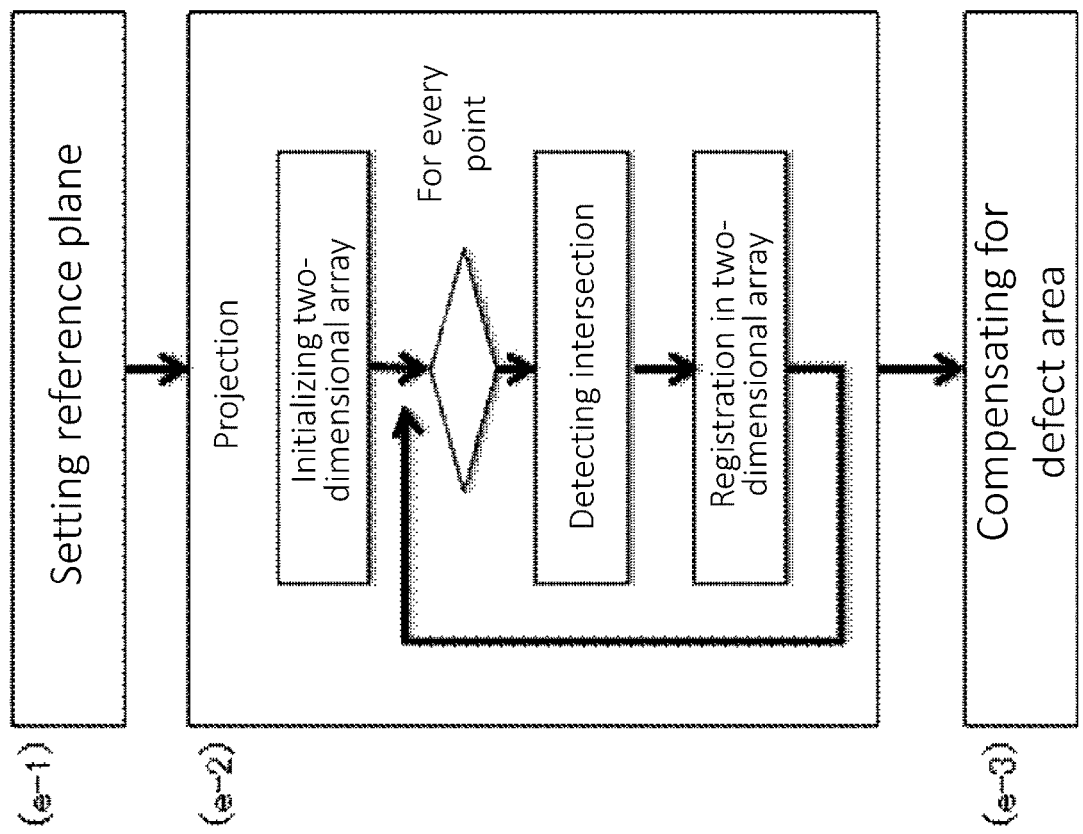
FIG. 8 is a flowchart showing an example of a process flow of an area detection means of the map creation system according to Embodiment 2 of the present invention.

FIG. 1 shows an exemplary configuration of a map creation system according to Embodiment 2 of the present invention, which is the same as that according to Embodiment 1. Each of FIG. 2 and FIG. 8 shows an example of processing flow of the map creation system according to Embodiment 2 of the present invention, where FIG. 2 is the same as that of Embodiment 1. FIG. 2 also shows function blocks of the map creation system according to Embodiment 2 of the present invention. FIG. 8 is also regarded as a function block diagram of an area detection means, showing the details thereof, of the map creation system according to Embodiment 2.

Figure 7:
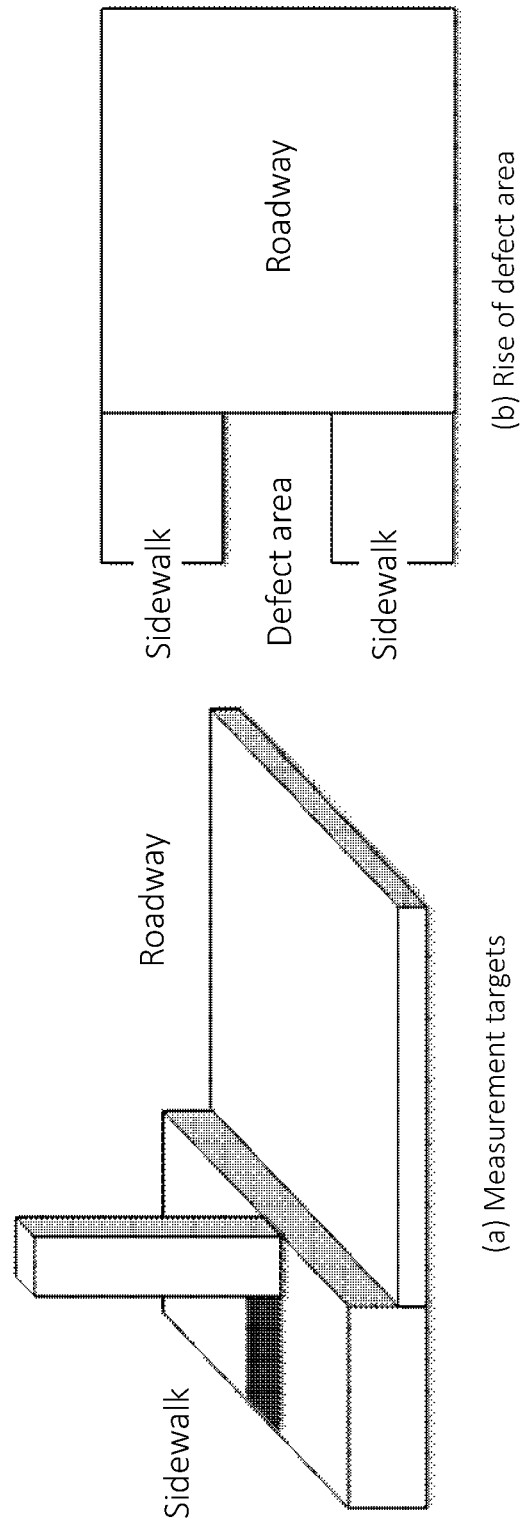
FIG. 7 are illustrative drawings to explain operation of a map creation system according to Embodiment 2 of the present invention.

FIG. 7(a) is a drawing schematically showing an example of the measurement target. In this example, a structure, such as a roadside tree, exists on the sidewalk. When laser beam is emitted from a sensor above the roadway, an area which the laser beam does not reach appears behind the roadside tree on the sidewalk as shown in the drawing. If this target were processed by the method described in Embodiment 1, a defect area would appear as shown in FIG. 7(b).

The object of Embodiment 2 is to avoid a rise of a defect area like this.

(System Configuration)

The system configuration is the same as that in Embodiment 1.

(Operation)

The operations from (a) Relative position acquisition to (d) Direction vector calculation are the same as those in Embodiment 1.

(e) Area Detection

Here, a flow of an area detection process to detect a sidewalk area from the measurement target as shown in FIG. 7(a) is described.

(e-1) Setting Reference Plane

First, a reference plane is defined for the determination. The reference plane should be defined to be as close as possible to the area to be detected and to be inclined against it with an inclination angle that is as small as possible. In a case of detecting a sidewalk area, for example, it is preferable to choose a horizontal plane close to the ground as a reference plane.

The size of the reference plane area ought to be suitable for the size of the area covered by the map to be created. When a map of rectangular shape is to be created, it also should be rectangular shape whose vertical side lies along the direction going from south to north and whose horizontal side lies along the direction going from east to west.
(e-2) Projection Next, each point in the point cloud is projected along their direction vector.

The followings are the detailed descriptions.
(e-2-1) Initializing Two-Dimensional Array The reference plane defined in (e-1) is segmented into mesh-shaped divisions of, for example, 5 cm squares. In case the length of the reference plane area is 10 m and the width thereof is 5 m, the reference plane area is to be segmented into 20,000 mesh-shaped divisions in total: 200 divisions in length and 100 divisions in width.

Next, in the PC 21 of the data processing system 2, a two-dimensional array corresponding to the above mesh-shaped structure is prepared in the main memory and initialized. For the initial values, for example, "−1"s are set (refer to FIG. 10(*a*)).

Figure 9:
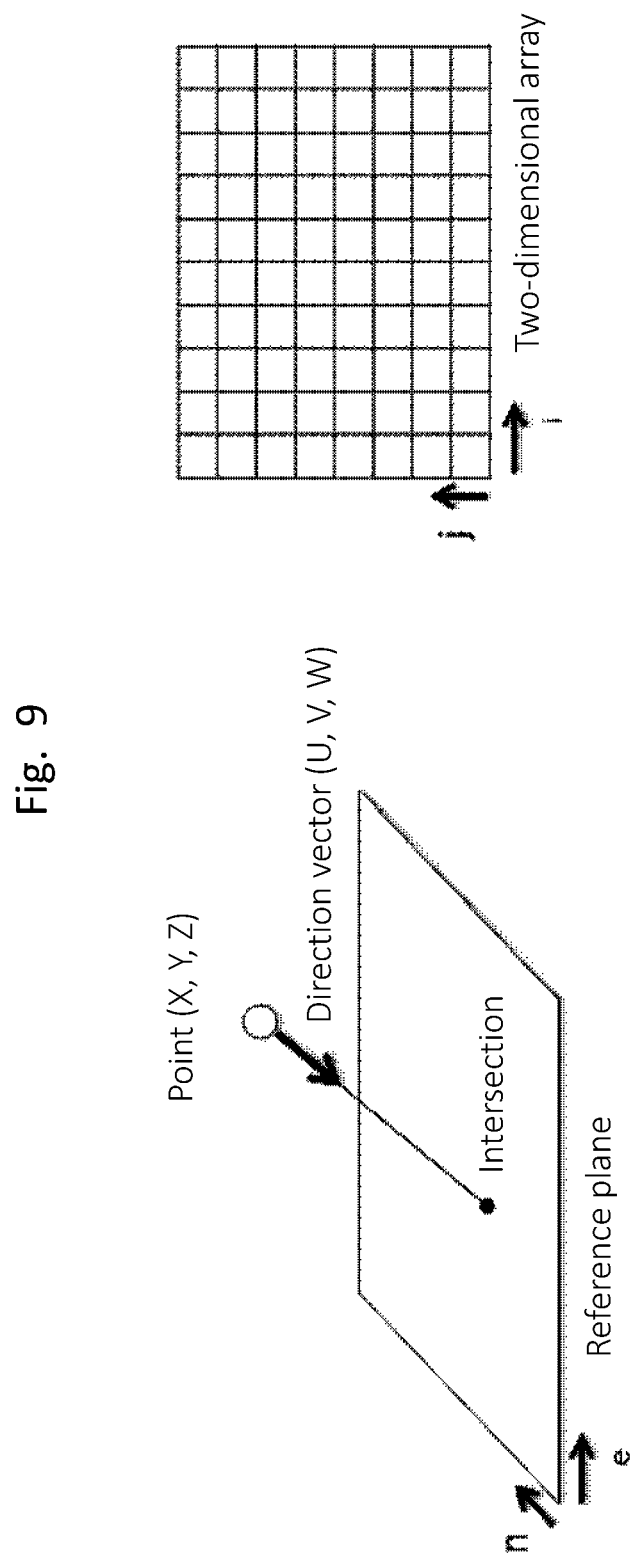
FIG. 9 are illustrative drawings to explain area detection of the map creation system according to Embodiment 2 of the present invention.

Next, the following procedures are performed to each of the points composing the created point cloud.
(e-2-2) Detecting Intersection Each point is projected along their direction vector. As shown in FIG. 9, a line that passes the point (X, Y, Z) and which lies along its direction vector (U, V, W) is obtained, and then, the intersection of the line and the reference plane is obtained. This intersection is represented by a coordinate system (e, n) of the reference point.
(e-2-3) Registration in Two-Dimensional Array Next, the mesh-shaped division to which the intersection belongs is identified. Assume that the intersection is represented by (e, n) and the array element corresponding to the intersection is denoted by (i, j). When the size of a single mesh-shaped division is m, the corresponding array element is defined as below:

$$i=e/m$$

$$j=n/m$$

The distance d from the intersection (e, n) to the point (X, Y, Z) is obtained and, according to the distance d, the array element is labeled.

When the distance d is smaller than a predetermined value th1, the point is considered to be close to the reference plane and, therefore, judged to be a point composing the area, so that the label 1 is given to the division. When the distance d is equal to or larger than the value th1 and smaller than another predetermined value th2, the point is judged to be included in an area not to be extracted, such as a roadway area, so that the label 0 is given. When the distance d is larger than the value th2, the point is judged to be possibly no longer a neighborhood point of a sidewalk area nor a roadway area, because the laser beam is reflected by a structure, such as a roadside tree. This means the intersection is included in a "defect area", so that the label 9 is given (see FIG. 10(*b*)).
(e-3) Compensating for Defect Area In the two-dimensional array, a mesh-shaped division which a label 9 is given is a candidate division of the defect area. The label 9 division that touches the label 1 division is judged to be a part of the sidewalk area and the label 9 is replaced with the label 1. The replacements are applied multiple times. The obtained result is shown in FIG. 10(*c*). As shown in the drawing, the defect area has disappeared.

The remaining label 9 divisions can be regarded as a defect area that has appeared on the roadway due to another structure. Since these divisions do not touch a label 1 division, the compensation is not performed to them. As described, it is possible to give a label 1 only to a division that is judged to be a part of the sidewalk area. As shown in FIG. 10(*d*), by identifying the outline of the area composed by the label 1 divisions, the sidewalk area is determined.
(f) Drawing The drawing process is the same as that in Embodiment 1.

A map creation system according to Embodiment 2 is configured as described above.

According to the system configuration described above, the area detection means sets a reference plane in the three-dimensional space; projects each point composing the point cloud onto the set reference plane along their direction vectors; extracts and compensates for the defect area from the projection result onto the reference plane; and detects the area on the basis of the compensation result. As a result of these steps, an area can be correctly detected even if the point cloud data includes points related to a defect area. This configuration, therefore, is effective in creating an accurate map with a simple operation.

INDUSTRIAL APPLICABILITY

The map creation system and the map creation method according to the present invention can be applied to the systems or the like which measure the positions and the shapes of the infrastructures or the objects along a road to create a map.

REFERENCE SIGNS LIST

1: mobile measurement vehicle
2: data processing system
11: laser measurement unit
12: IMU
13: GPS receiver
14: external storage
15: PC
21: PC
22: external storage
23: input device
24: display
25: printer

The invention claimed is:
1. A map creation system, comprising:
a relative position detector to measure distances and directions from a sensor to points on a surface of an infrastructure or an object and to create point cloud data in a relative space with the sensor at a center thereof;
a sensor position detector to measure a position and an attitude of the sensor and to create sensor position data;
a processor to execute a program; and
a memory to store the program which, when executed by the processor, performs processes of:
calculating position information of a point cloud in an absolute space on the basis of the point cloud data in the relative space and the sensor position data;
obtaining a direction vector from the sensor to each of points of the point cloud in the absolute space on the basis of the point cloud data in the relative space and the sensor position data;
extracting points composing a plane area on the basis of the position information and the direction vectors of the point cloud in the absolute space to obtain an area outline on the basis of distribution of the extracted points, the extraction process including setting a reference plane to provide a reference in a three-dimensional space, the extraction process including extracting a point whose neighborhood points have direction vector distribution that fits vector distribution calculated from positional relationships between the reference plane and the sensor position data, and not extracting a point whose neighboring points have direction vector distribution that does not fit the calculated vector distribution; and drawing a picture representing an outline of a detected area with a line based on the extracted point.

2. A map creation method, comprising:

distances and directions from a sensor to points on a surface of an infrastructure or an object to create point cloud data in a relative space with the sensor at a center thereof;

measuring a position and an attitude of the sensor to create sensor position data;

calculating position information of a point cloud in an absolute space on the basis of the point cloud data in the relative space and the sensor position data;

obtaining a direction vector from the sensor to each of points of the point cloud in the absolute space on the basis of the point cloud data in the relative space and the sensor position data;

extracting points composing a plane area on the basis of the position information and the direction vectors of the point cloud in the absolute space to obtain an area outline on the basis of distribution of the extracted points, the extraction including setting a reference plane to provide a reference in a three-dimensional space, the extraction including extracting a point whose neighborhood points have direction vector distribution that fits vector distribution calculated from positional relationships between the reference plane and the sensor position data, and not extracting a point whose neighboring points have direction vector distribution that does not fit the calculated vector distribution; and drawing a picture representing an outline of a detected area with a line based on the extracted point.

* * * * *